(12) United States Patent
Tiao et al.

(10) Patent No.: US 7,440,689 B2
(45) Date of Patent: Oct. 21, 2008

(54) ELECTROMAGNETICALLY ACTUATED ADJUSTING APPARATUS FOR LENS

(75) Inventors: Kuo Tung Tiao, Hsinchu (TW); Shih Yuan Chang, Taipei (TW); Ming Jen Tsai, Nantou (TW)

(73) Assignee: Aiptek International Inc., Hsin-Chu (TW)

( * ) Notice: Subject to any disclaimer, the term of this patent is extended or adjusted under 35 U.S.C. 154(b) by 444 days.

(21) Appl. No.: 11/168,496

(22) Filed: Jun. 29, 2005

(65) Prior Publication Data
US 2006/0245747 A1 Nov. 2, 2006

(30) Foreign Application Priority Data
Apr. 29, 2005 (TW) ................................ 94114047 A

(51) Int. Cl.
*G03B 3/00* (2006.01)

(52) U.S. Cl. ............................. 396/89; 310/12; 310/15; 310/20; 310/22; 310/36; 310/37; 310/154.02; 310/154.03; 310/154.27; 310/156.12; 310/156.35; 335/38; 335/202

(58) Field of Classification Search ............ 310/154.02, 310/154.03, 154.09, 154.12, 154.27, 156.12, 310/156.35, 12, 15, 20, 22, 36, 37, 80; 335/38, 335/179, 177, 180, 182, 183, 202; 396/351, 396/89
See application file for complete search history.

(56) References Cited
U.S. PATENT DOCUMENTS

| | | | | | |
|---|---|---|---|---|---|
| 3,339,419 | A | * | 9/1967 | Wilcox | .................... 73/514.23 |
| 4,466,725 | A | * | 8/1984 | Hirohata | ..................... 396/132 |
| 4,554,610 | A | * | 11/1985 | Metz et al. | .................. 361/144 |
| 5,384,506 | A | * | 1/1995 | Aoshima | .................. 310/49 R |
| 5,388,086 | A | * | 2/1995 | Yamasaki et al. | ........ 369/44.14 |
| 6,157,103 | A | * | 12/2000 | Ohta et al. | ................ 310/49 R |

* cited by examiner

*Primary Examiner*—W. B. Perkey
*Assistant Examiner*—Michael A Strieb
(74) *Attorney, Agent, or Firm*—Troxell Law Office, PLLC

(57) ABSTRACT

An electromagnetically actuated adjusting apparatus for lens is disclosed. The adjusting apparatus comprises a body capable of furnishing a lens inside, at least one permanent magnet, a first magnetic conductor and a second magnetic conductor. The first and the second magnetic conductors are respectively wound with a plurality of coils. The permanent magnet is adjoined to the body and has a first polarity and a second polarity opposing each other. The first magnetic conductor has at least a first extension member provided opposite to the first polarity. The second magnetic conductor has at least a second extension member provided opposite to the second polarity. The first extension member and the second extension member can better converge magnetic flux lines emanating from the coils when charged to the positions nearing the two polarities of the permanent magnet so high-efficiency focusing and zooming of lens can be achieved.

17 Claims, 10 Drawing Sheets

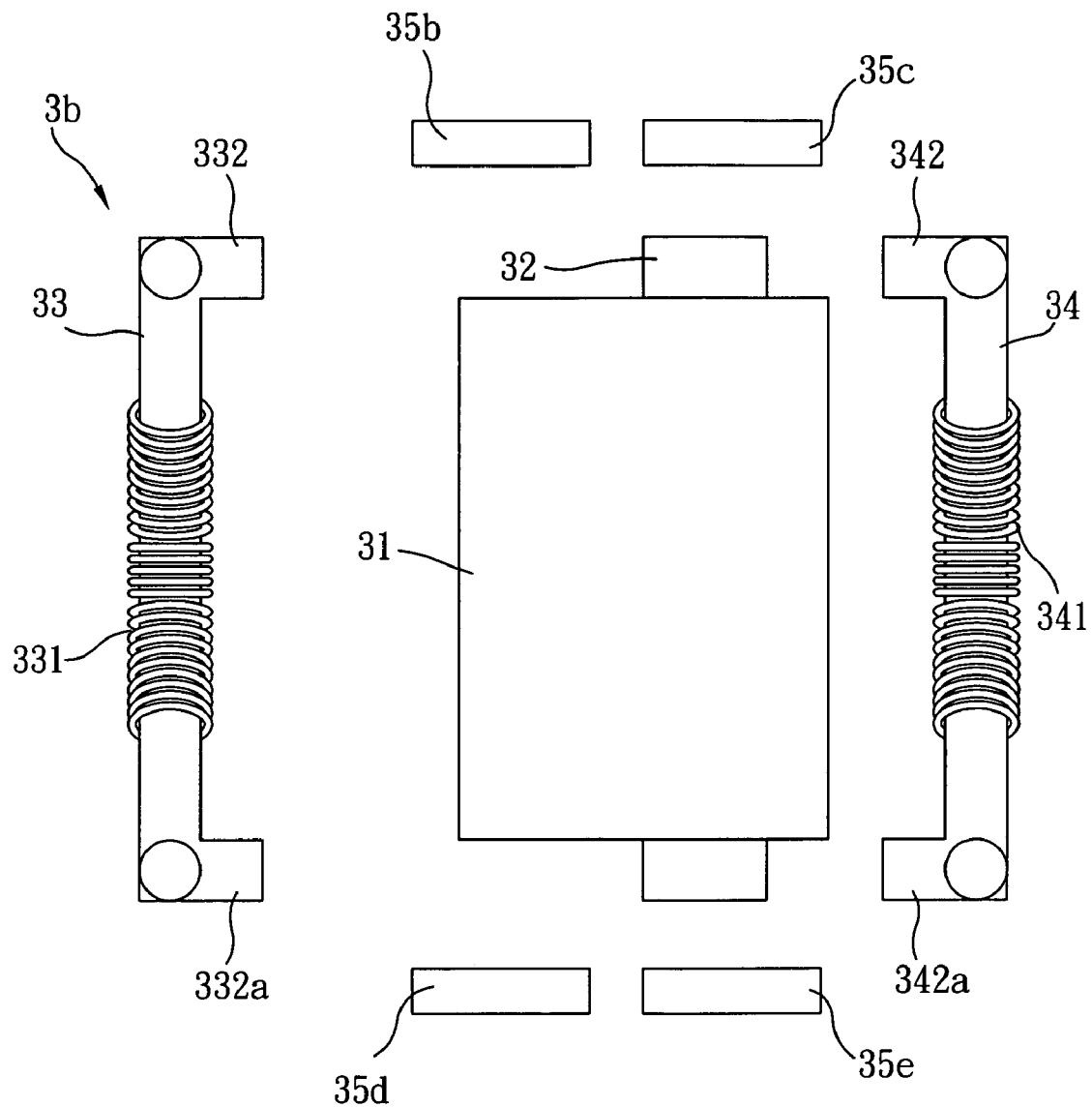
F I G. 5

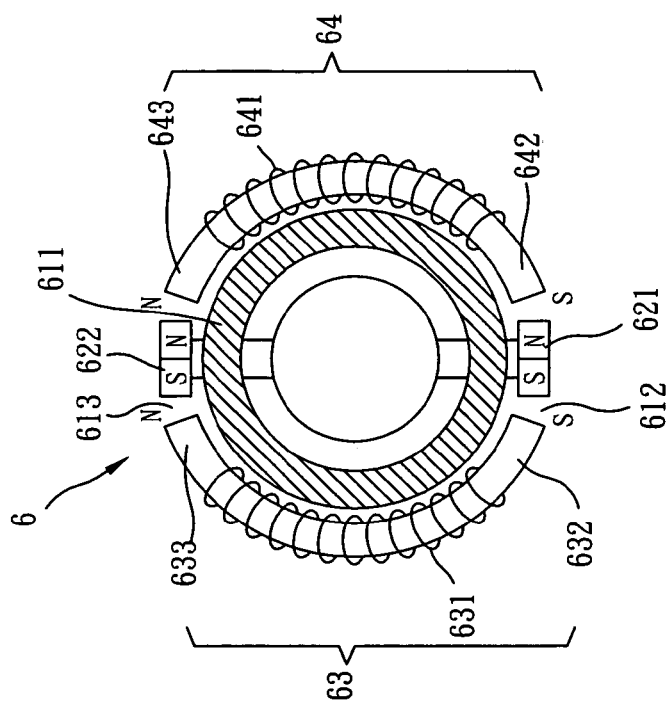
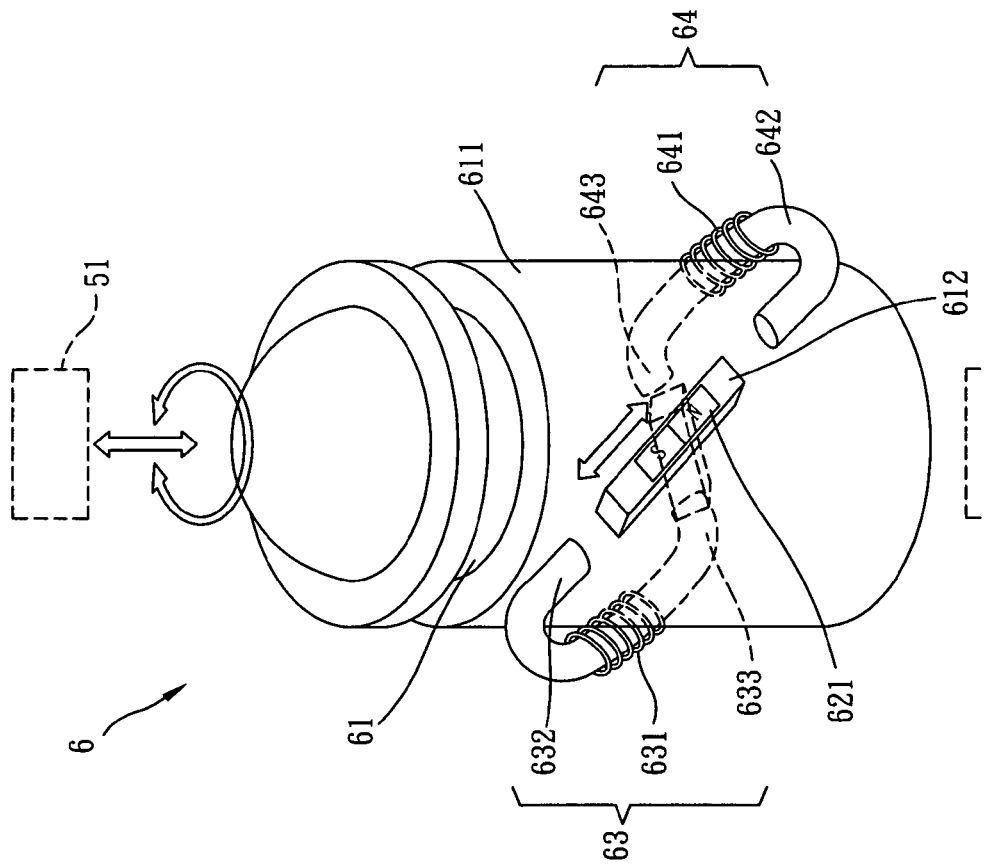
FIG. 8B
FIG. 8A

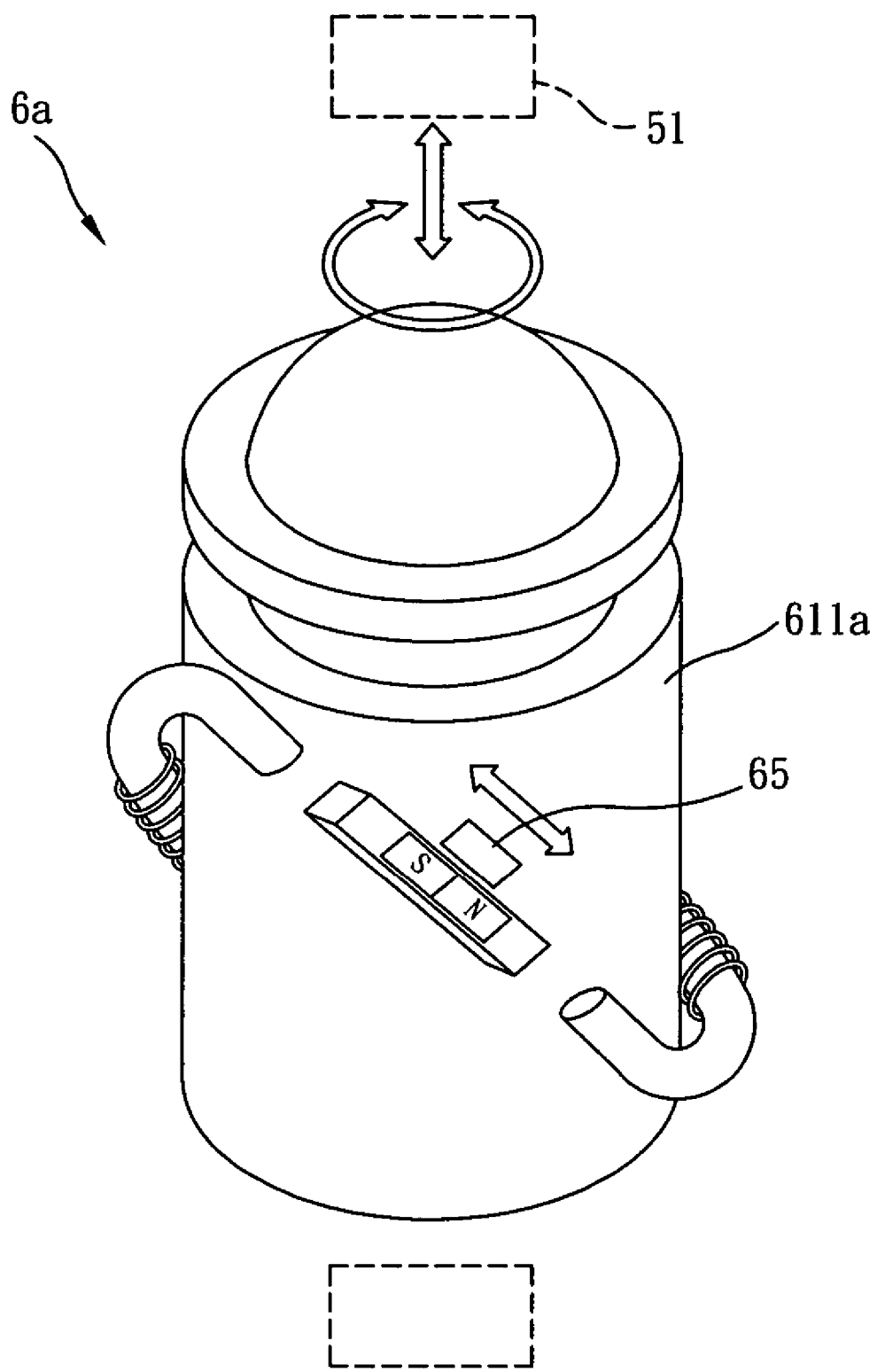
F I G. 9

ELECTROMAGNETICALLY ACTUATED ADJUSTING APPARATUS FOR LENS

BACKGROUND OF INVENTION

1. Field of the Invention

The present invention relates to an electromagnetically actuated adjusting apparatus for lens, more particularly an adjusting apparatus that uses magnetic flux produced by coils to push the permanent magnet arranged on the body of lens for shifting the position of lens body.

2. Description of the Prior Art

Driven by technological advances and strong consumer demands, all kinds of information products and equipments are conceived and borne, in which camera is a significant invention. In the electronic age, portability is an essential requirement for camera. Thus the design and manufacture of camera are directed towards small size and lightweight.

Lens has always been one of the key components that influence the photographic quality of a camera. During photographing, lens position sometimes needs shifting or fine tuning to adjust its aperture or shutter speed in response to the intensity of light, or to change the image magnifying power or fine tune image clarity so the camera lens can zoom or focus.

Referring to FIG. 1 which is a schematic diagram showing the side view of a conventional mechanically-driven lens position shifting means, the lens position shifting apparatus comprises a lens 11, a first connecting member 12, a second connecting member 13, a threaded pole 14, a guide rod 15, and a motor 16. The first connecting member 12 and second connecting member 13 are respectively adjoined to the top and bottom of lens 11, and the first connecting member 12 is linked to threaded pole 14, while the second connecting member 12 is linked to guide rod 15. When the lens position needs to be shifted, the motor 16 drives the threaded pole 14 to rotate in forward or backward direction that sets lens 11 to undergo corresponding linear displacement 92 between threaded pole 14 and guide rod 15 to adjust the lens 11 position. But because mechanically-driven lens position shifting apparatus tends to be bulky, consumes more power, and costs more with its precision mechanical positioning, only few conventional cameras still use such means, while practically no digital camera nowadays employs such mechanically-driven lens position shifting apparatus.

Digital camera uses instead an electromagnetically actuated lens position shifting apparatus. FIG. 2A and FIG. 2B are respectively a perspective view and a side view of the conventional electromagnetically actuated lens position shifting apparatus 2. Such apparatus 2 consists of a lens 21, a permanent magnet ring 22, a first coil assembly 23 and a second coil assembly 24. The permanent magnet ring 22 is adjoined to lens 21 with a first polarity 25 and a second polarity 26 at each end respectively. The first coil assembly 23 and the second coil assembly 24 are respectively wound on each side around the periphery of lens body 21 and correspond to the first polarity 25 and second polarity 26.

When the lens position needs to be shifted, the first coil assembly 23 and the second assembly 24 are charged to generate magnetic flux lines in a specific direction (i.e. along the axial direction of lens 21), which could propel the permanent magnet ring 22 to the left or right along the axial direction of lens 21. As such, lens 21 moves towards a predefined direction to achieve the purpose of lens position shift.

However in the conventional electromagnetically actuated lens position shifting apparatus 2, coil assemblies 23 and 24 are wound around the periphery of lens 21 where magnetic flux lines converge at the center axis of lens 21, while magnetic flux lines at the position of permanent magnet ring 22 are not as concentrated in comparison. As such, the majority of magnetic flux lines emanated from coil assemblies 23 and 24 have no action, resulting in low efficiency and higher power consumption. In addition, the permanent magnet ring 22 has to be of comparable size in order to be propelled by the relatively weak magnetic flux. Consequently, the entire apparatus structure is bulky, and with winding around only two sides of the lens 21, the apparatus allows only two-position displacement of lens 21, which runs counter to the goal of small size and light weight. Thus improvement of the lens position shifting means has been an ongoing effort.

SUMMARY OF INVENTION

The primary object of the present invention is to provide an electromagnetically actuated adjusting apparatus for lens which enables the convergence of magnetic flux lines nearing the permanent magnet when the coils are charged to achieve the effect of high-efficiency focusing or zooming of lens.

Another object of the present invention is to provide an electromagnetically actuated adjusting apparatus for lens which enables automatic and effective positioning of lens after it is moved to a predetermined position. That is, even the supply of currents to coils is cut off, the lens will remain at the position without unintended movement so as to reduce power consumption.

A further object of the present invention is to provide an electromagnetically actuated adjusting apparatus for lens which offers the design of more concentrated distribution of magnetic flux lines to allow size reduction of permanent magnet so as to achieve smaller and lighter lens assembly.

Yet another object of the present invention is to provide an electromagnetically actuated adjusting apparatus for lens which disposes a plurality of yokes at a predetermined location within the displacement range of permanent magnet to form an aligning member that enables the permanent magnet together with the lens to be engaged at the place where the yoke-constituted aligning member is located in the process of position adjustment to achieve the purpose of more than two-position lens shift.

BRIEF DESCRIPTION OF THE DRAWINGS

The details of the present invention will be more readily understood from a detailed description of the preferred embodiments taken in conjunction with the following figures.

FIG. 5 is a side view of the third embodiment of magnetically actuated adjusting apparatus for lens according to the invention.

FIG. 8A is a perspective view of the sixth embodiment of magnetically actuated adjusting apparatus for lens according to the invention.

FIG. 8B is a top view of the sixth embodiment of magnetically actuated adjusting apparatus for lens according to the invention.

FIG. 9 is a perspective view of the seventh embodiment of magnetically actuated adjusting apparatus for lens according to the invention.

DETAILED DESCRIPTION

Figure 1:
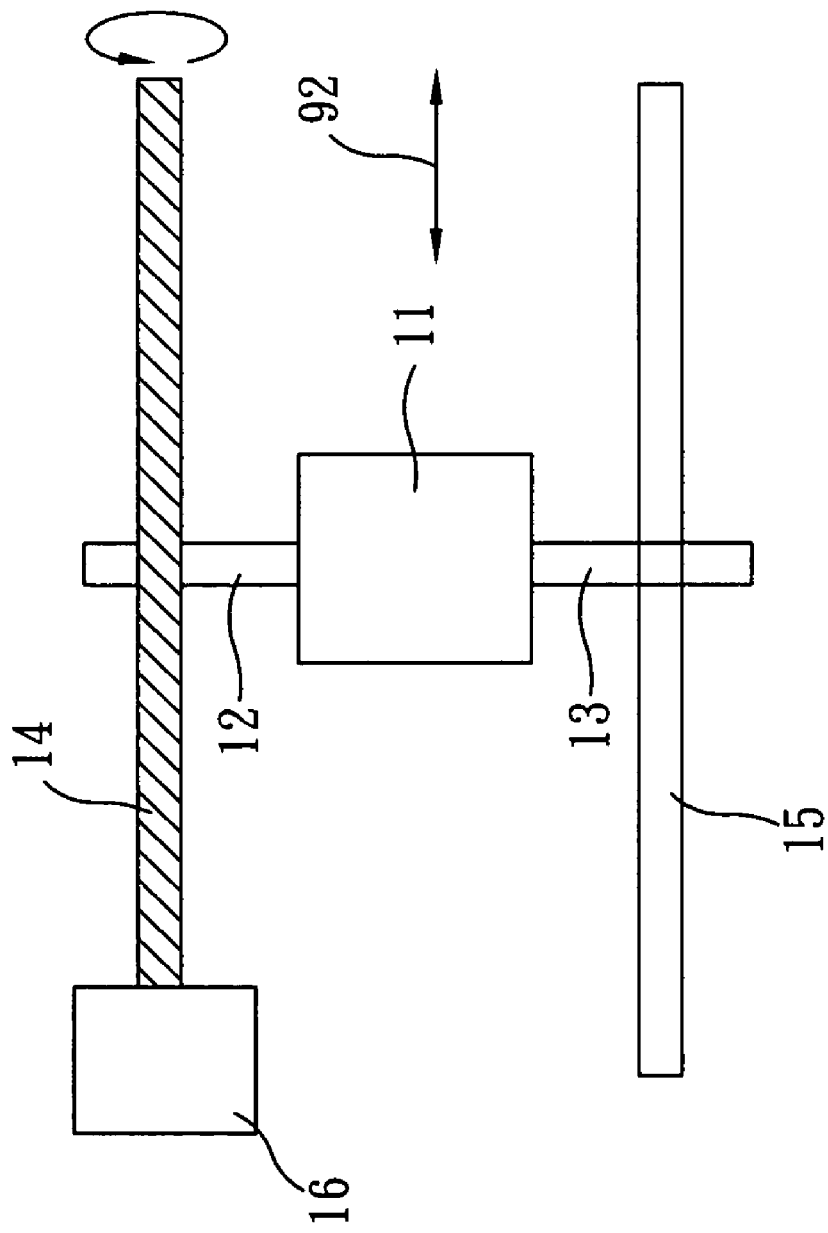
FIG. 1 is a schematic view of a conventional mechanically-driven lens position shifting apparatus.
Figure 2B:
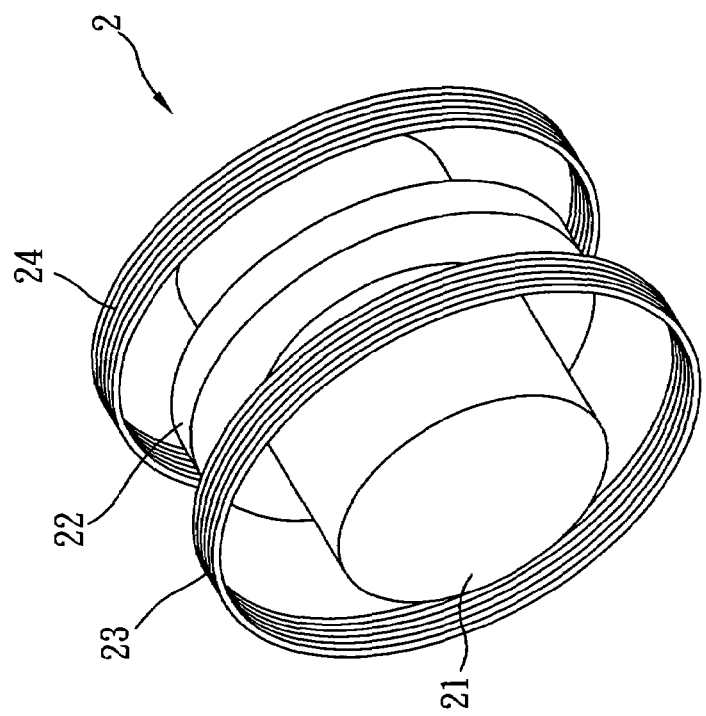
FIG. 2B is a side view of a conventional magnetically actuated lens position shifting apparatus.
Figure 2A:
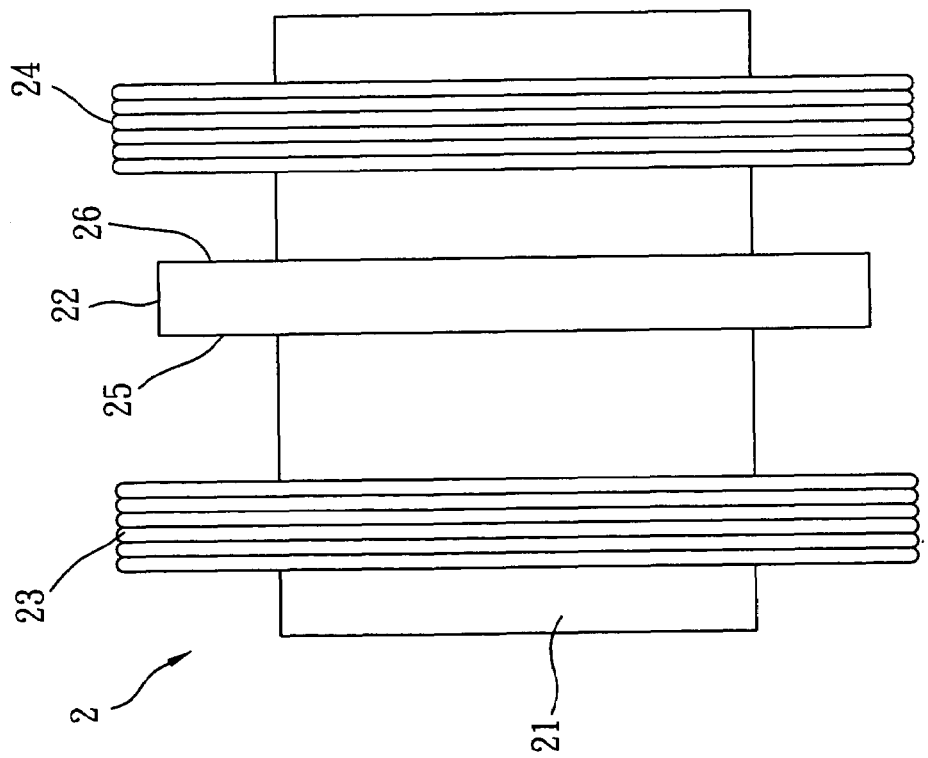
FIG. 2A a perspective view of a conventional magnetically actuated lens position shifting apparatus.
Figure 3A:
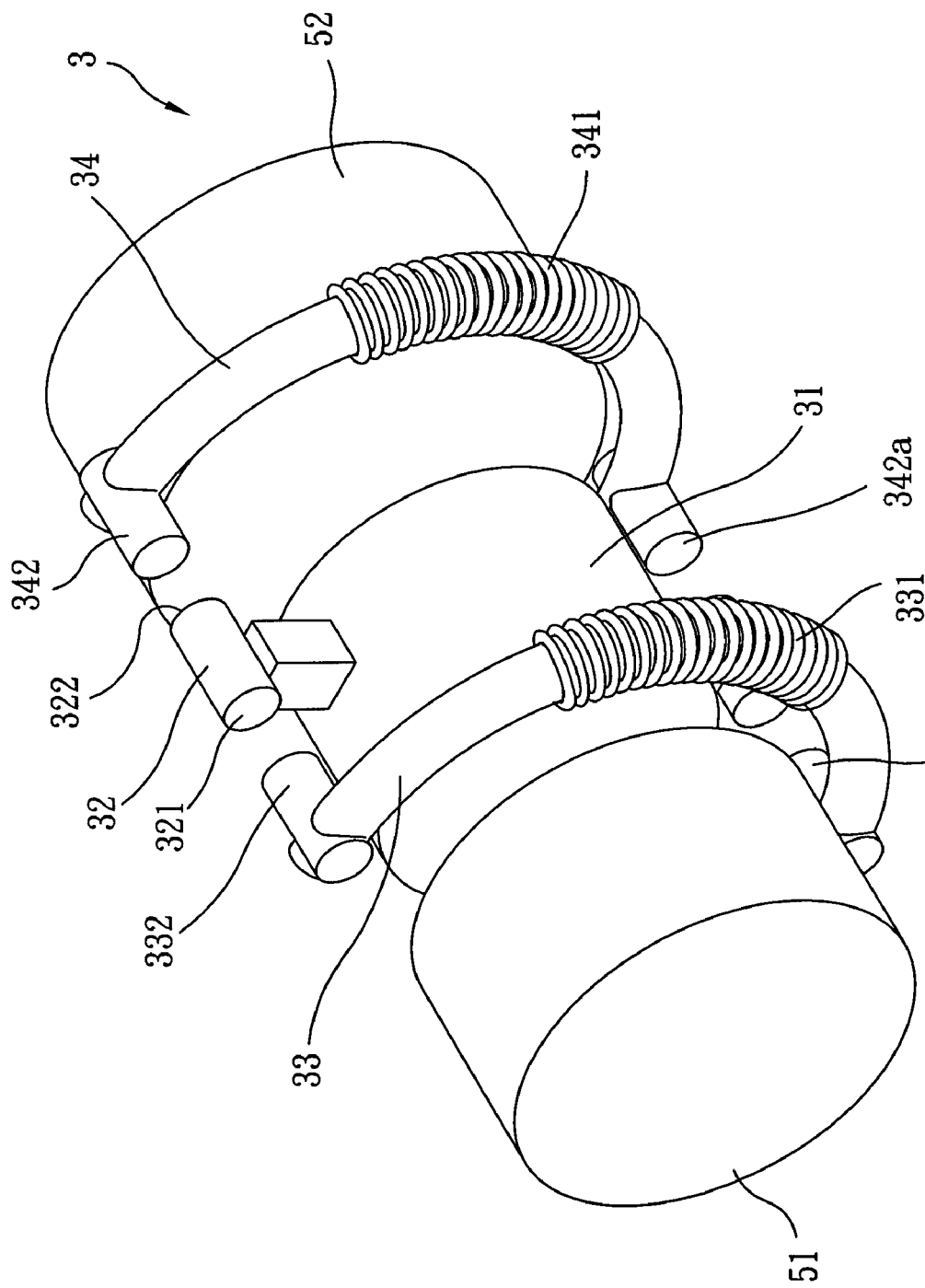
FIG. 3A is a perspective view of the first embodiment of magnetically actuated adjusting apparatus for lens according to the invention.
Figure 3C:
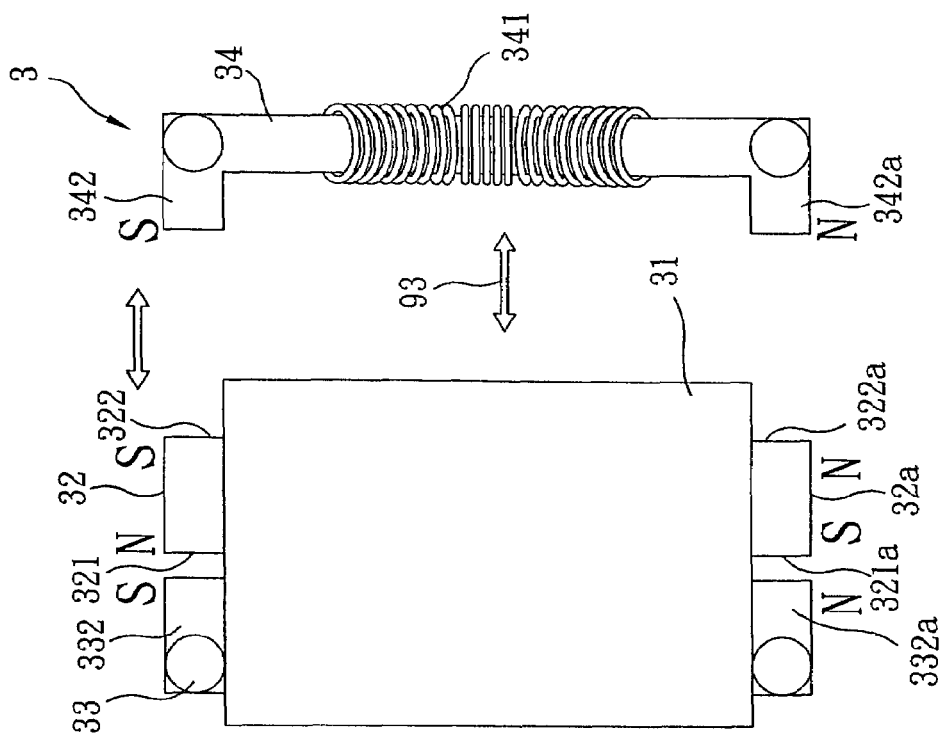
FIG. 3C is a side view of the second position of magnetically actuated adjusting apparatus for lens in the first embodiment according to the invention.
Figure 3B:
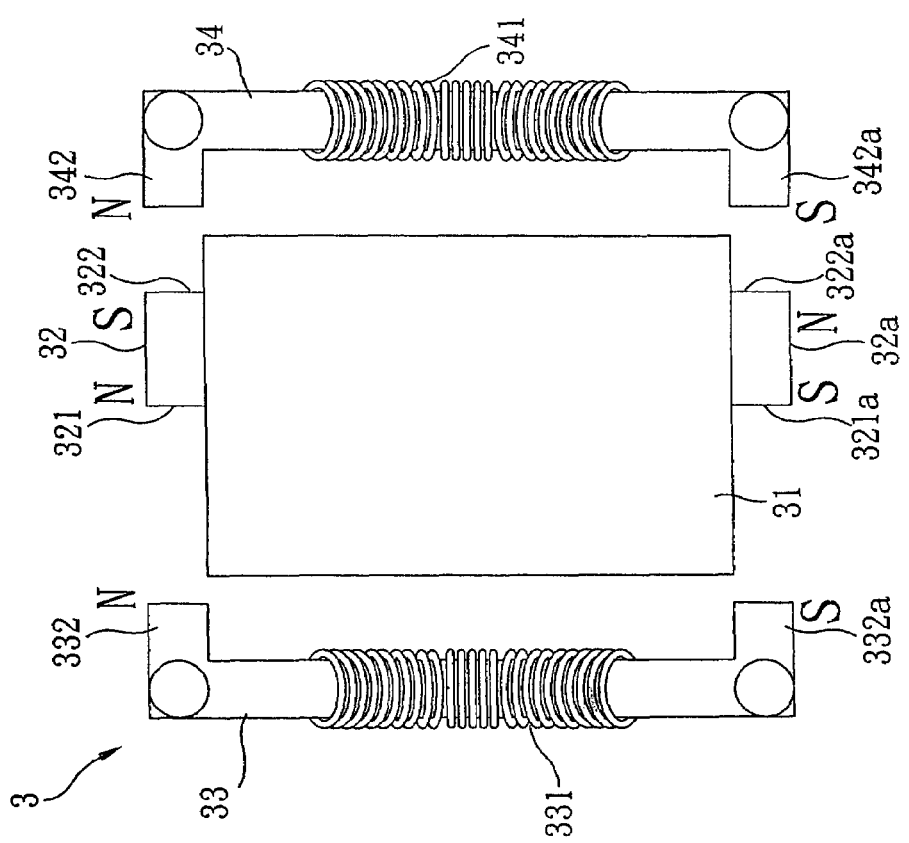
FIG. 3B is a side view of the first position of magnetically actuated adjusting apparatus for lens in the first embodiment according to the invention.

Referring to FIG. 3A to FIG. 3C which are respectively a perspective view of the first embodiment of the electromagnetically actuated adjusting apparatus for lens according to the present invention and side views showing the action of the apparatus. The electromagnetically actuated adjusting apparatus for lens 3 comprises a lens body 31 capable of furnishing a lens inside, at least a permanent magnet 32, a first magnetic conductor 33 and a second magnetic conductor 34. In this preferred embodiment, the electromagnetically actuated adjusting apparatus for lens 3 is used in a camera (e.g. digital camera or mobile phone with digital camera module). Thus the body 31 may be a movable lens set inside the camera lens. Another non-movable anterior lens set 51 may be provided on the left side (front side closer to the object to be shot) of body 31, while an image capturing module 52, e.g. a charge coupled device (CCD) or CMOS image sensor, is disposed on the right side (rear side) of body 31. The aperture of the lens (not shown in figures) may be selectively positioned in front of the anterior lens set 51, the body 31, or the image capturing module 52 according to design.

Although the detailed description of the embodiments below use the lens focusing or zooming functions of digital camera as examples to illustrate the scope of application of the invention, the electromagnetically actuated adjusting apparatus 3 for lens may be applied in other mechanisms that require precision adjustment of distance and multi-position shift. But for description purpose, only the implementation of the invention on lens will be discussed, which however should not affect the protected scope of claim.

In this embodiment as shown in FIG. 3A, the permanent magnet 32 is in cylindrical shape adjoined to body 31 at a proper location of its periphery and has a first pole 321 and a second pole 322 of opposite polarity at each end respectively. To achieve better balance of force, this embodiment has two permanent magnets 32, arranged respectively at two opposing sides of the outer circumferential contour of body 31. Naturally, the amount of permanent magnet 32 may be one or any other number, or disposed at other location or in other shapes. Such variations may be easily achieved by people familiar with the skill following the aforesaid description without departing from the essence of the invention or the spirit and scope of the invention, and hence will not be elaborated here. As shown in FIG. 3B and FIG. 3C, when the first pole 321 at one end of the permanent magnet 32 (situated on the left side of permanent magnet 32) is a N pole and the second pole 322 (situated on the right side of permanent magnet 32) is a S pole, the first pole 321a at one end of another permanent magnet 32a (situated on the left side of permanent magnet 32a) is preferably a S pole and its second pole 322a (situated on the right side of permanent magnet 32a) is preferably a N pole.

The first magnetic conductor 33 and the second magnetic conductor 34 are respectively near the front and rear sides on the axial direction of body 31, and made of magnetically permeable material (e.g. yoke). The first magnetic conductor 33 is wound with a plurality of coils 331 at the central portion. Also to achieve better balance of force, the first magnetic conductor 33 has respectively a first extension member 332 and 332a at each end. The first extension members 332 and 332a extend to a location nearing and corresponding to first poles 321 and 321a. The second magnetic conductor 34 is also wound with a plurality of coils 341 at the central portion. The second magnetic conductor 34 also has respectively a first extension member 342 and 342a at each end. The second extension members 342 and 342a extend to a location nearing and corresponding to second poles 322 and 322a.

As shown in FIG. 3B, when DC driving current of predetermined voltage is applied to the coils 331 of first magnetic conductor 33, the first extension members 332 and 332a become respectively N pole and S pole. At this time, because the magnetic flux lines of first extension member 332 and 332a concentrate and correspond to the first poles 321 and 321a of permanent magnets 32 and 32a, it would cause the body 31 together with permanent magnets 32 and 32a to shift along its axial direction towards the second magnetic conductor 34 under the principle that similar poles repel. Simultaneously, by driving coils 341 of second magnetic conductor 34, the second extension members 342 and 342a can form a N pole and a S pole respectively. By the principle that opposite poles attract, the attraction between respectively the N pole and S pole of second magnetic conductor 34 and the second poles 322 and 322a of permanent magnets 32 and 32a causes body 31 to draw close to the second magnetic conductor and engage at a position nearing second magnetic conductor 34.

Conversely as shown in FIG. 3C, the invention can also drive the coils 331 of first magnetic conductor 33 to form S pole and N pole at the first extension members 332 and 332a respectively, and at the same time drive coils 341 of second magnetic conductor 34 to form S pole and N pole at the second extension member 342 and 342a. As such, the body 31 can draw close to the first magnetic conductor 33 and stay at a position in its proximity. Thus body 31 can undergo a predetermined linear displacement 93 between first extension members 332, 332a and second extension members 342, 342a to achieve the objective of focusing or zooming.

Figure 4A:
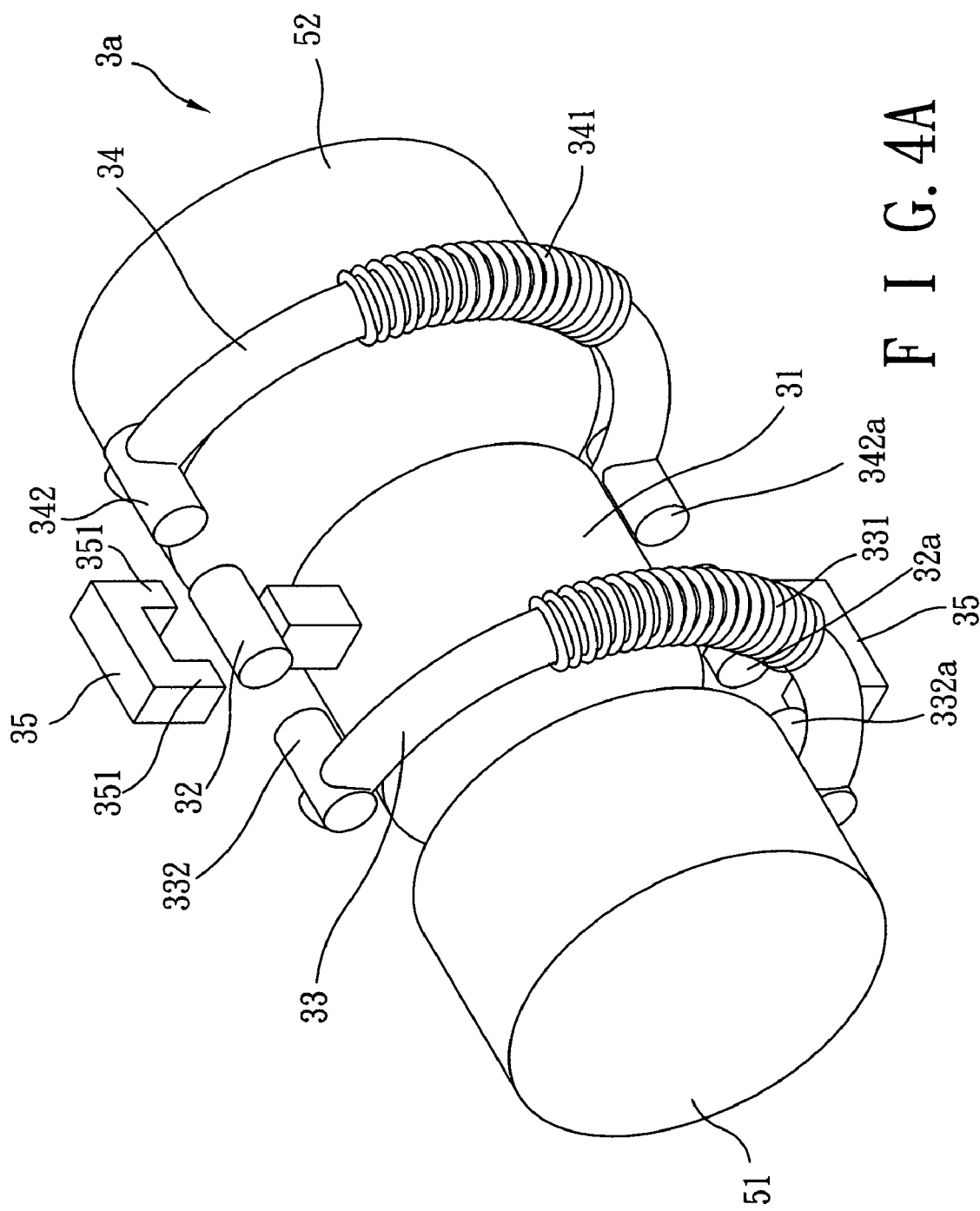
FIG. 4A is a perspective view of the second embodiment of magnetically actuated adjusting apparatus for lens according to the invention.
Figure 4B:
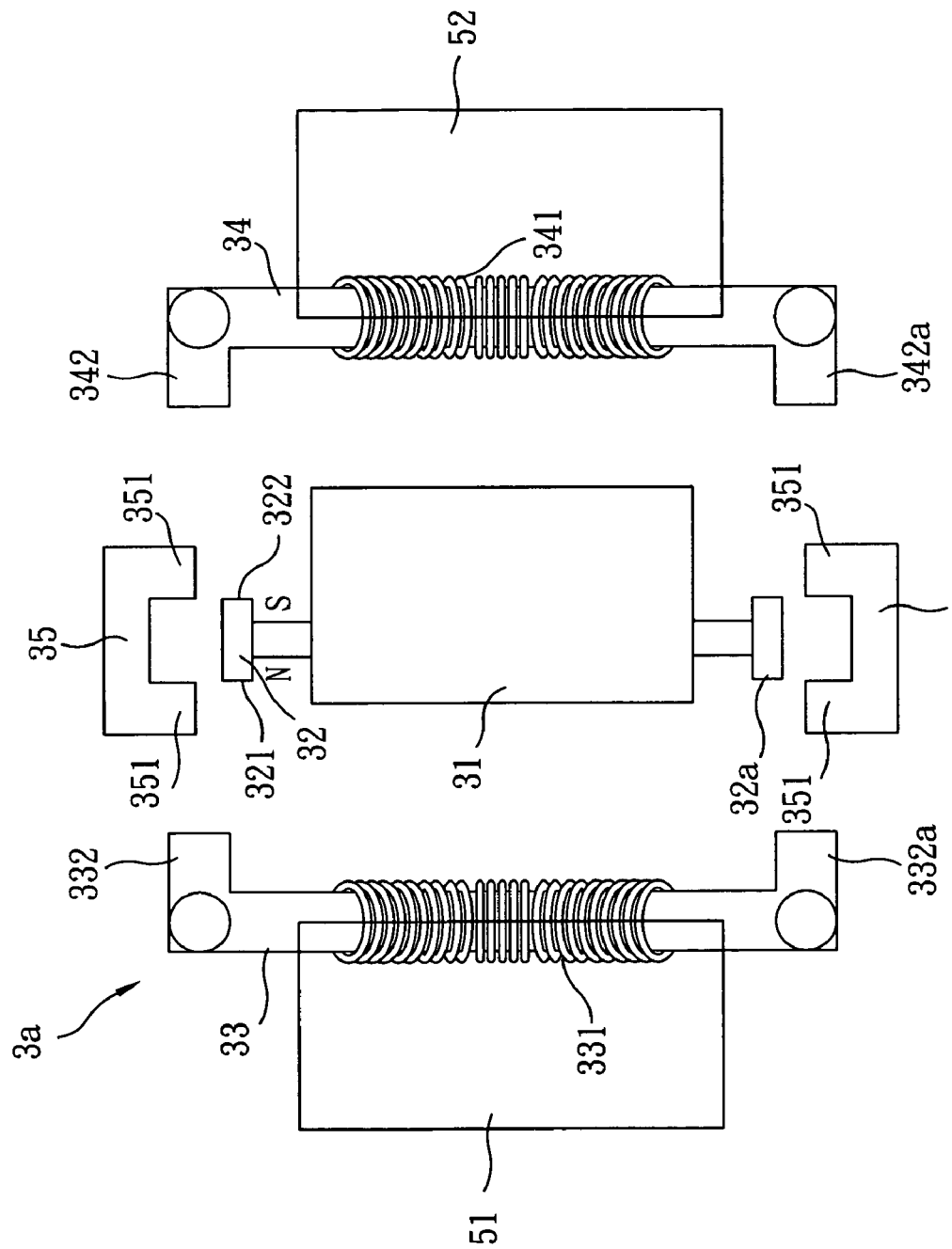
FIG. 4B is a side view of the second embodiment of magnetically actuated adjusting apparatus for lens according to the invention.

FIG. 4A to FIG. 4B are respectively the perspective view and side view of the second embodiment of the electromagnetically actuated adjusting apparatus 3a for lens according to the present invention. The second embodiment discloses an adjusting apparatus that allows three-position adjustment, principally by providing a plurality of yokes at predefined locations within the displacement range of permanent magnet 32 to form an aligning member 35, so that permanent magnet 32 together with lens body 31 may be selectively attracted and positioned at where the aligning member 35 made of a plurality of yokes is located to allow three-position or more shift of lens.

As shown in FIG. 4A and FIG. 4B, in addition to the components shown in FIG. 3A, the electromagnetically actuated adjusting apparatus 3a further includes at least one aligning member 35 made of yokes of predefined shapes, and permanent magnet 32 is situated exactly between said aligning member 35 and body 31, and the aligning member 35 is disposed between first extension member 332 and first extension member 342 to achieve better state of force balance. The aligning member 35 is designed to be corresponding to permanent magnets 32 and 32a in quantity and location. A convexity 351 is disposed at each end of aligning member 35 which is close to the first pole 321 and second pole 322 at each end of permanent magnet 32. By driving coils 331 and 341, the first magnetic conductor 33 and second magnetic conductor 34 simultaneously produce repelling magnetic force against permanent magnet 32 to push the permanent magnet 32 together with body 31 to the center corresponding to the location of aligning member 35. When body 31 is positioned at aligning member 35, the current supply to coils 331 and 341 may stop, while permanent magnet 32 is automatically positioned at the aligning member 35 through its own magnetic force of attraction to help save power. Thus the electromagnetically actuated adjusting apparatus 3a can offer the function of three-position adjustment through selective positioning of body 31 at any of the locations of first magnetic conductor 33, second magnetic conductor 34, and aligning member 35.

FIG. 5 is a side view of the third embodiment of the electromagnetically actuated adjusting apparatus 3b for lens according to the present invention. To achieve the function of more than three-position focusing and zooming, the electromagnetically actuated adjusting apparatus 3b for lens is designed with two aligning members 35b and 35c. The permanent magnet 32 is provided exactly between the two aligning members 35b, 35c and body 31, while the other permanent magnet is also provided between two aligning members 35d, 35e and body 31. In addition, the two aligning members 35b, 35c are disposed between first extension member 332 and second extension member 342. Similarly the other two aligning members 35d, 35e are disposed between another first extension member 332a and another second extension member 342a. In this embodiment, the aligning members 35b, 35c need not be a convexity structure as shown in FIG. 4A, but a rectangular cube structure. Through such design, the body 31 may be positioned at a place nearing first magnetic conductor 33 or second magnetic conductor 34, or may be selectively positioned at the location of aligning member 35b or aligning member 35c to allow four-position shift of lens. Naturally, a position adjustment mechanism that allows even more lens position shifts may be designed according to the same principle illustrated in FIG. 5.

Figure 6:
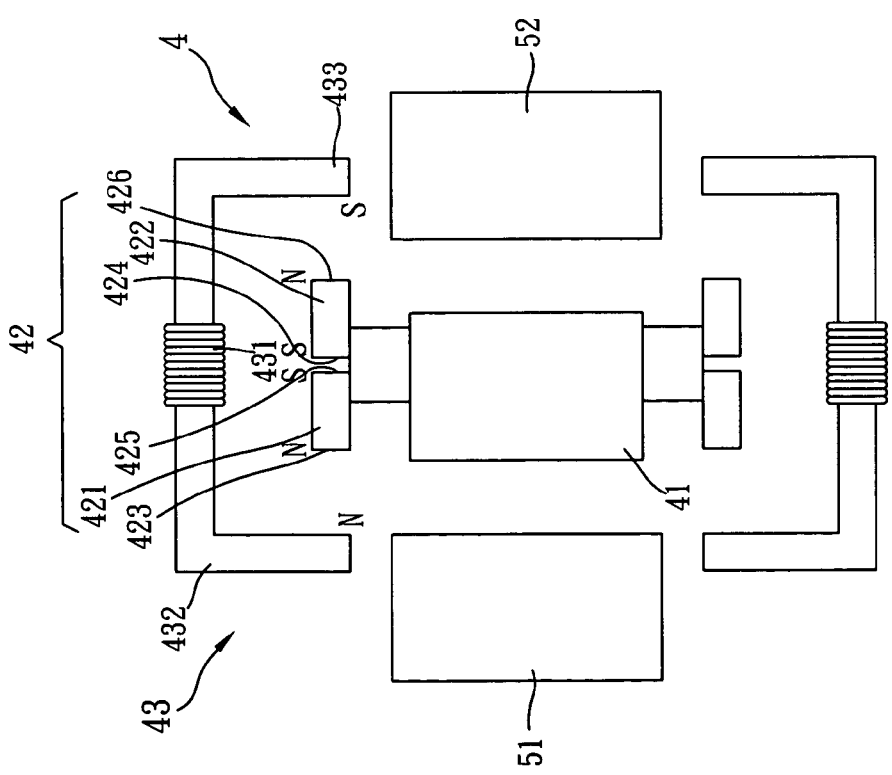
FIG. 6 is a side view of the fourth embodiment of magnetically actuated adjusting apparatus for lens according to the invention.

FIG. 6 is a side view of the fourth embodiment of the electromagnetically actuated adjusting apparatus 4 for lens according to the present invention. The adjusting apparatus 4 in this embodiment comprises a body 41, at least one permanent magnet set 42, and at least one magnetic conducting member 43. The permanent magnet set 42 is adjoined to body 41 and has a first permanent magnet 421 and a corresponding second permanent magnet 422. Both the first permanent magnet has 421 and the second permanent magnet 422 have a second pole 425, 424 respectively (S pole) which are arranged adjacent to each other, so that both ends of said permanent magnet set 42 have the same first pole 423, 426 (N pole) respectively. The magnetic conducting member 43 is made of magnetically permeable material having a plurality of coils 431 wound around the central portion. The magnetic conducting member 43 has respectively a first extension member 432 and a second extension member 433 at each end respectively. The first extension member 432 corresponds to the first pole 423 of first permanent magnet 421, and the second extension member 433 corresponds to the other first pole 426 of second permanent magnet 422.

By driving the coils 431 of magnetic conducting member 43, the first extension member 432 and the second extension member 433 become respectively N pole and S pole. At this time, because the first extension 432 and the first pole 423 of first permanent magnet 421 have the same polarity and repel each other, while the second extension member 433 and the first pole 426 of second permanent magnet 422 have opposite polarity and attract each other, it would cause the body 41 to move towards the position adjacent to the second extension member 433. Conversely, by driving coils 431 of magnetic conducting member 43, the first extension member 432 and second extension member 433 form a N pole and a S pole respectively. At this time, because the first extension member 432 and the first pole 423 of first permanent magnet 421 have opposite polarity and attract each other, while the second extension member 433 and the first pole 426 of second permanent magnet 422 have the same polarity and repel each other, it would cause the body 41 to move towards the position adjacent to the first extension member 432. Such design enables the magnetic conducting member 43 to be arranged at the same side as the permanent magnet set 42 and extending substantially parallel to the axial direction of the body 41, instead of located in front of the body 31 and extending around the circumference of body 31 as the previously described embodiment shown in FIG. 3A.

Figure 7:
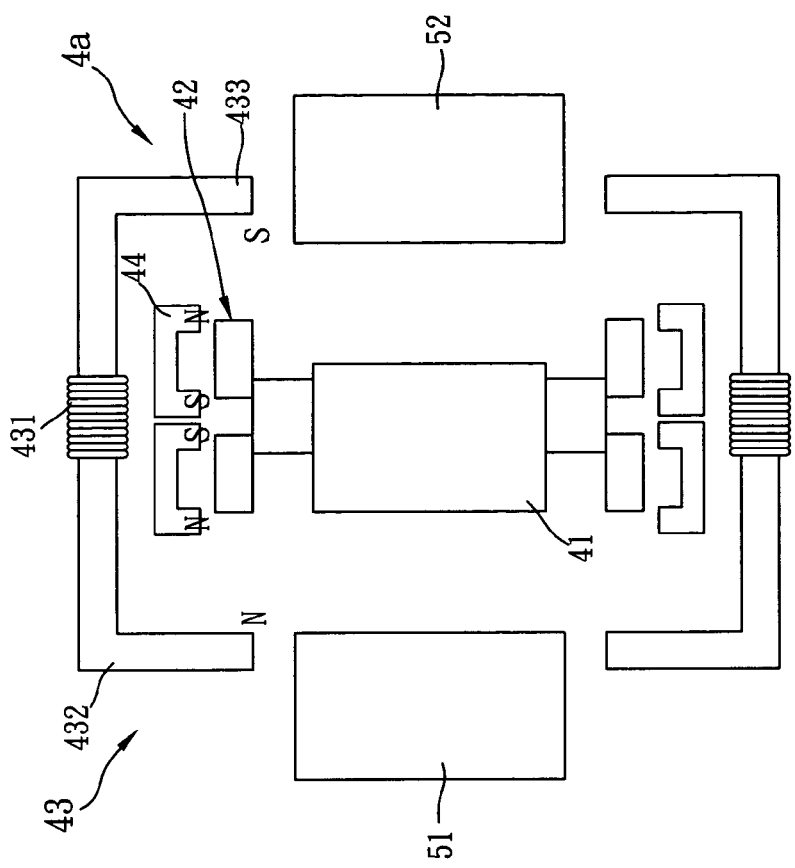
FIG. 7 is a side view of the fifth embodiment of magnetically actuated adjusting apparatus for lens according to the invention.

FIG. 7 is a side view of the fifth embodiment of the electromagnetically actuated adjusting apparatus 4a for lens according to the present invention. The adjusting apparatus 4 as shown in FIG. 6 performs only the function of two-position adjusting. To achieve three-position or more focusing or zooming, the electromagnetically actuated adjusting apparatus 4a for lens shown in FIG. 7 further includes at least one aligning member 44. Of course, to achieve more position focusing or zooming, the adjusting apparatus 4a may have two or more such aligning member 44. Since the material, structure, locations, actions and functions of aligning member 44 have been described in detail in the foregoing embodiments and similar minor variations will not be elaborated here.

FIG. 8A to FIG. 8B are respectively the perspective view and side view of the sixth embodiment of the electromagnetically actuated adjusting apparatus 6 for lens according to the present invention. This embodiment is designed principally for lens focusing motion with shorter displacement stroke (i.e. displacement distance of lens is less than 0.5 mm) using threaded screw like rotation to reduce the effect of mechanical tolerance and enhance relatively displacement precision. As shown in FIG. 8A and FIG. 8B, the adjusting apparatus 6 in this embodiment comprises similarly a body 61, two permanent magnets 621, 622 and a first and a second magnetic conductor 63, 64. The permanent magnets 621, 622 are adjoined to body 61 and move with it. Also, the poles of two permanent magnets 621, 622 are arranged in such a way that they face the same direction (i.e. both S poles face the left side in FIG. 8B). The first and the second magnetic conductors 63, 64 similarly have a plurality of coils 631, 641 wound around their central portion, and the first and the second magnetic conductors 63, 64 similarly have respectively first extension members 632, 633 and second extension members 642, 643. The first extension members 632, 633 and the second extension members 642, 643 similarly oppose each other and are adjacent to the two poles of the two permanent magnets 621, 622.

The difference between the sixth embodiment of the invention as shown in FIG. 8A and FIG. 8B and the other embodiments mentioned above is that, the body 61 is provided with a hollow sleeve 611 outside and is able to conduct rotational and axial linear movement on it. The sleeve 611 has inclined guide grooves 612, 613 at the locations corresponding to permanent magnets 621 and 622 respectively that the two permanent magnets 621 and 622 can be confined and guided by the inclined guide grooves 612 and 613 to undergo oblique linear movement along the extension of guide grooves 612 and 613. The first and the second magnetic conductors 63 and 64 are disposed encircling the periphery of sleeve 611 and render both the first extension members 632, 633 and second extension members 643, 642 alternately arranged on different planes to correspond to the two poles of permanent magnets 621, 622. Through such arrangement, when current of predetermined direction is applied to coils 631, 641, the first and second magnetic conductors 63, 64 would guide and converge the magnetic flux lines to the vicinity of permanent magnets 621, 622, which causes permanent magnets to move obliquely along guide grooves 612, 613. As such, the body 61 is driven to undergo threading like displacement in sleeve 611 to increase stroke and reduce the effect of mechanical tolerance, hence increasing the displacement precision. In addition, in light that first and second magnetic conductors 63, 64 encircle the periphery of sleeve 611 without extending to the front end and back end of body 61, the arrangement of first and second magnetic conductors 63, 64 is given more flexibility.

FIG. 9 is a perspective view of the seventh embodiment of the electromagnetically actuated adjusting apparatus 6a for lens according to the present invention. The adjusting apparatus 6a in this embodiment has largely the same structure and elements as the sixth embodiment shown in FIG. 8A and FIG. 8B. The only difference is that adjusting apparatus 6a shown in FIG. 9 has at least one aligning member 65 at a proper location on sleeve 611a of adjusting apparatus 6a to achieve the effect of three-position or more focusing or zooming.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An electromagnetically actuated adjusting apparatus, comprising:
    a body;
    at least one permanent magnet adjoined to the body and having a first pole and a second pole opposing each other on each side of the permanent magnet;
    a first magnetic conductor wound with a plurality of coils and having at least one first extension member which corresponds to the first pole; and
    a second magnetic conductor wound with a plurality of coils and having at least one second extension member which corresponds to the second pole,
    wherein a hollow sleeve is further arranged outside the body with an inclined guide groove disposed thereon at a location corresponding to the permanent magnet so as to confine and guide the permanent magnet to undergo oblique linear motion alone the extension of guide groove;
    the first and second magnetic conductors are disposed encircling a periphery of the sleeve and render the first extension member and the second extension member situated at each end of guide groove to correspond to the two poles of permanent magnet;
    wherein when predetermined current is applied to the coils, the first and the second magnetic conductors will produce magnetic flux lines which converge in the vicinity of the two poles of permanent magnets to propel the permanent magnet to undergo oblique motion along the guide groove and hence drive the body to undergo threading like displacement in the sleeve.

2. The electromagnetically actuated adjusting apparatus according to claim 1, wherein the body is a lens set.

3. The electromagnetically actuated adjusting apparatus according to claim 1, wherein driving the coils of first magnetic conductor enables the first extension member and the first pole to attract each other.

4. The electromagnetically actuated adjusting apparatus according to claim 1, wherein driving the coils of first magnetic conductor enables the first extension member and the first pole to repel each other.

5. The electromagnetically actuated adjusting apparatus according to claim 1, wherein driving the coils of second magnetic conductor enables the second extension member and the second pole to attract each other.

6. The electromagnetically actuated adjusting apparatus according to claim 1, wherein driving the coils of second magnetic conductor enables the second extension member and the second pole to repel each other.

7. The electromagnetically actuated adjusting apparatus according to claim 1, wherein the body may undergo a predetermined linear displacement.

8. The electromagnetically actuated adjusting apparatus according to claim 1, further comprising at least one aligning member; in addition, the permanent magnet being situated substantially halfway between said aligning member and the body.

9. The electromagnetically actuated adjusting apparatus according to claim 8, wherein the aligning member is made of magnetically permeable material.

10. An electromagnetically actuated adjusting apparatus for a lens, comprising:
    a body;
    at least one permanent magnet adjoined to the body and having a first pole and a second pole opposing each other on each side of the permanent magnet;
    a first magnetic conductor for generating magnetic force and corresponding to the first pole;
    a second magnetic conductor for generating magnetic force and corresponding to the second pole; and
    at least one aligning member made of magnetically permeable material and provided between the first magnetic conductor and the second magnetic conductor, and the permanent magnet being situated substantially halfway between said aligning member and the body;
    wherein driving at least either the first magnetic conductor or the second magnetic conductor to generate predetermined magnetic force can push the permanent magnet and enable it to be selectively repositioned along with the body to a location near the first magnetic conductor, the second magnetic conductor or the aligning member,
    wherein a hollow sleeve is further arranged outside the body with an inclined guide groove disposed thereon at the location opposing the permanent magnet to confine and guide the permanent magnet to undergo oblique linear motion along the extension of guide groove;
    the first and second magnetic conductors are disposed encircling the periphery of the sleeve and render the first extension member and the second extension member situated at each end of guide groove to correspond to the two poles of permanent magnet;

wherein driving at least either the first magnetic conductor or the second magnetic conductor to produce predetermined magnetic force will enable the permanent magnet to undergo oblique motion along the guide groove and hence drive the body to undergo threading like displacement in the sleeve.

11. The electromagnetically actuated adjusting apparatus according to claim 10, wherein the first magnetic conductor is wound with a plurality of coils and has at least one first extension member corresponding to the first pole.

12. The electromagnetically actuated adjusting apparatus according to claim 10, wherein the second magnetic conductor is wound with a plurality of coils and has at least one second extension member corresponding to the second pole.

13. An electromagnetically actuated adjusting apparatus for a lens, comprising:
- a body;
- at least one permanent magnet set adjoined to the body and having a first permanent magnet and a corresponding second permanent magnet, the ends of first permanent magnet and second permanent magnet having the same polarity are arranged opposing each other, so that the opposing ends of said permanent magnet set have the same first pole and the second pole respectively;
- at least one magnetic conducting member wound with a plurality of coils and having at least one first extension member corresponding to the first pole and a second extension member corresponding to the second pole at opposing ends respectively,
- wherein a hollow sleeve is further arranged outside the body with an inclined guide groove disposed thereon at the location opposing the permanent magnet to confine and guide the permanent magnet to undergo oblique linear motion alone the extension of guide groove;
- the first and second magnetic conductors are disposed encircling the periphery of the sleeve and render the first extension member and the second extension member to correspond to the two poles of permanent magnet;
- wherein when the magnetic conducting member is driven to produce predetermined magnetic force, the first extension member and the second extension member can converge the magnetic force around the vicinity of the two poles of permanent magnet to propel the permanent magnet to undergo oblique motion along the guide groove and hence drive the body to undergo threading like displacement in the sleeve.

14. The electromagnetically actuated adjusting apparatus according to claim 13, wherein the body is a lens set.

15. The electromagnetically actuated adjusting apparatus according to claim 13, wherein driving the coils of magnetic conducting member enables the first extension member and the first pole to attract each other and the second extension member and the first pole to repel each other.

16. The electromagnetically actuated adjusting apparatus according to claim 13, wherein driving the coils of magnetic conducting member enables the first extension member and the first pole to repel each other and the second extension member and the first pole to attract each other.

17. The electromagnetically actuated adjusting apparatus according to claim 13, wherein the body can undergo predetermined linear displacement, and said electromagnetically actuated adjusting apparatus further includes at least one aligning member made of magnetically permeable material, and the permanent magnet is provided between said aligning member and the body.

* * * * *